United States Patent Office 3,014,759
Patented Dec. 26, 1961

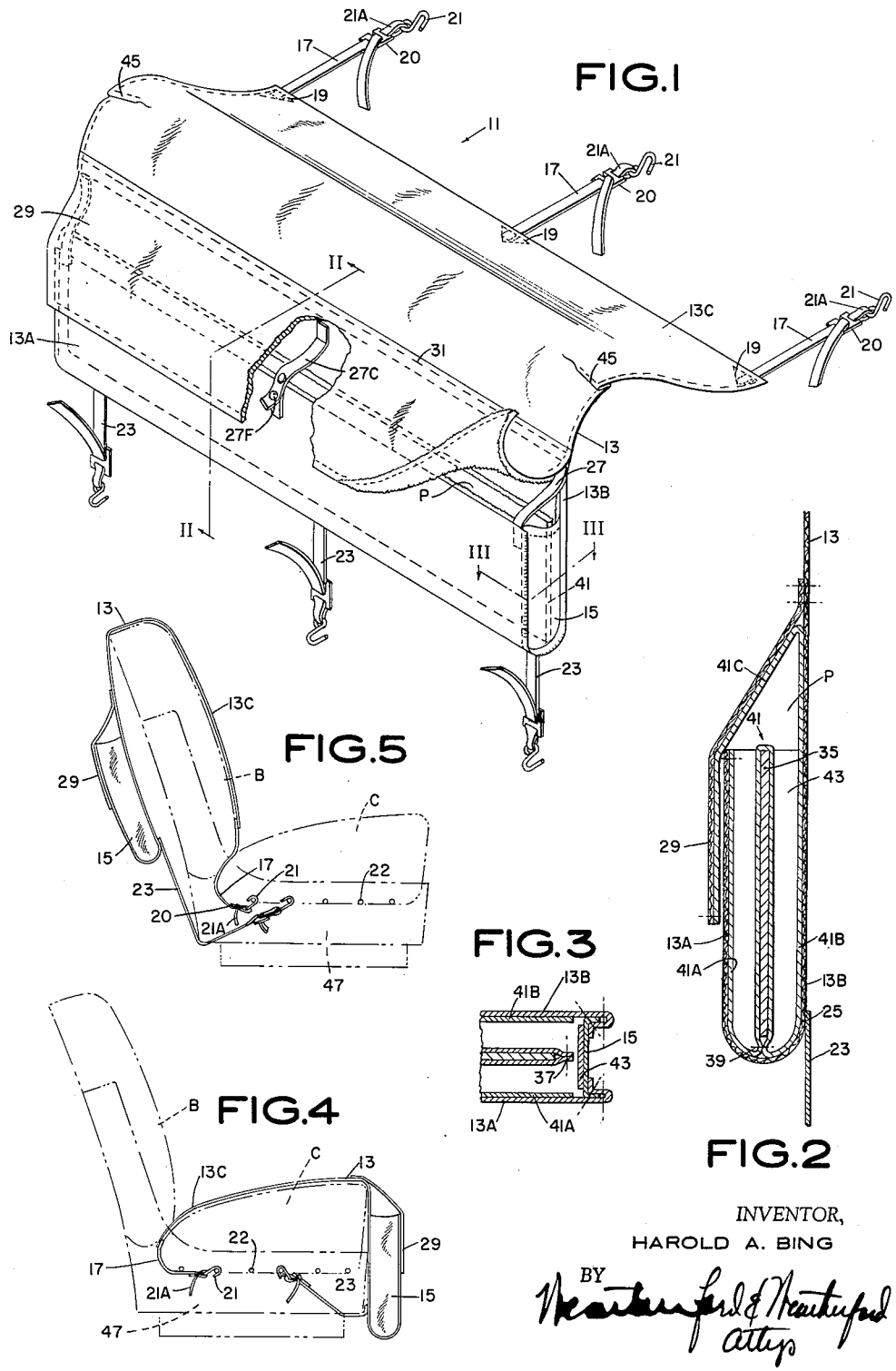

3,014,759
AUTOMOBILE UTILITY BAG
Harold A. Bing, 3401 Lakeshore Drive,
North Little Rock, Ark.
Filed July 18, 1958, Ser. No. 749,550
9 Claims. (Cl. 297—191)

This invention relates to an automobile utility bag.

More particularly the invention pertains to an easily attachable and detachable compartmented utility bag mountable in an automobile on the rear face of the back of the front seat, or on the front face of the seat cushion of the rear seat, by means of a seat-covering and protecting extension of the bag-forming piece of sheet material.

Specifically the invention is disclosed as reduced to practice as an article-stowing and carrying bag formed basically of a single piece of flexible sheet-material (such as cloth or sheet plastic) folded to define a pocket much longer than deep, said piece of material extending upwardly from the pocket to provide a panel for overlying areas of automobile seats to attach said bag thereto while desirably also protecting said seat areas, said bag also preferably including a relatively stiff but not brittle board inserted into said pocket to divide the same into two coextensive compartments, a soft article-protecting liner for the compartments, attached straps with hooks for anchoring said bag in place on a seat, and bridging straps, one with snap-type fasteners, for preventing undesirable gapping of the pocket.

The transportation of articles, such as guns, fishing tackle, toys, lunches, vacuum bottles, clothing, etc., within the passenger compartments of automobiles has long been a vexatious problem, and while pocketed bags have been proposed for carrying some of such articles, none has been provided having the versatility, capacity, convenience and overall efficiency of the present disclosure.

It is accordingly the principal object of this invention to provide a utility bag for automobiles capable of quick, easy and convenient mounting on the rear face of a seat back or on the front face of the seat cushion of the front or rear seat.

It is another object to provide such a bag having a supporting and attaching panel which also overlies and protects a large adjacent seat area.

It is a further object to provide such a bag with fleece-lined compartments for increased protection and improvement of orderliness of the stowed articles.

It is the overall object of the invention to generally improve the design and efficiency of automobile utility bags.

The means by which the foregoing and other objects of the present invention are accomplished and the manner of their accomplishment will be readily understood from the following specification upon reference to the accompanying drawings, in which:

FIG. 1 is a perspective view of a preferred embodiment of the invention.

FIG. 2 is an enlarged fragmentary elevational view of the bag, in section taken on the plane of the line II—II of FIG. 1.

FIG. 3 is an enlarged fragmentary plan view of the bag, in section taken on the plane of the line III—III of FIG. 1.

FIG. 4 is a side elevational view showing a seat-front installation of the bag.

FIG. 5 is a side elevational view showing the bag mounted on the rear surface of the back of an automobile seat.

Referring now to the drawings in which the various parts are indicated by numerals, the numeral 11 generally designates the utility bag. Bag 11 is formed basically of a single piece 13 of strong flexible sheet material, such as duck or other cloth, or sheet plastic. The piece 13 of cloth or plastic is almost square, in the disclosed embodiment of the invention, before it is turned up along one edge to provide the front panel 13A of the pocket generally designated P. The rear panel or wall of the pocket P is formed by the coextensive portion 13B of the piece of material 13. The pocket P is completed by sewing to the ends of panels 13A and 13B the vertically elongated gussets 15 preferably formed of material matching that of piece 13. In place of stitches 37 (FIG. 3) the seams can be formed by adhesively joining the connected edges, or by thermoplastic welding if the bag is fabricated of plastic sheet-material. The major portion areawise of the piece 13 is the extension panel 13C which serves the two important functions of overlying large seat areas (1) securely to fasten the bag to the supporting seat and (2) to serve as a seat-protecting cover.

The edge of extension panel 13C is provided with a plurality of attachment straps 17 fastened thereto as by stitching 19. Straps 17 are made adjustable as to length by conventional friction-holding buckles 20 formed of strong sheet-material. The end loops of the straps 17 pass through the eyes 21A of anchoring hooks 21, which are adapted to hook over the stringer wires or bars 22 conventionally employed to fix the lower ends of the usual upholstering coil springs found in automobile seat cushions. Similar anchoring straps 23 are stitched at 25 to the bottom edge of rear pocket panel 13B (FIG. 2) and are also equipped with adjusting buckles 19 and hooks 21 for like use in anchoring the lower edge of the bag 11.

To prevent undesirable gapping of the pocket P or drooping of its forward edge, a plurality of straps 27 may be stitched to the front edge of the pocket, and extend upwardly and rearwardly across the pocket and be stitched to the rear pocket panel 13B somewhat above the top of the pocket proper to improve vertical support. Centrally located strap (or straps) 27C is desirably attached to the pocket front panel 13A by one or more conventional snap fastener 27F so that the strap can be disconnected to facilitate placing or removing of articles, especially large objects such as guns.

The pocket is preferably equipped with a covering flap 29 formed by stitching at 31 a strip of matching material of a size to cover the pocket opening and overlap the front panel 13A to any desired degree.

It is also desirable to compartmentalize the pocket and/or to line the same with soft (fleecy) article-protecting material. Both desiderata are incorporated in the disclosure. A relatively stiff but not brittle strip 35 of fiberboard, cardboard, or plywood, etc., is conveniently positioned as a divider for the pocket P by locating it in a longitudinal pocket formed by stitching at 37 and 39 the piece 41 of fleecy cloth. Cloth piece 41 extends forwardly and then upwardly from the seam formed by stitches 39 to line with panel 41A the front pocket panel 13A, being fixed to the front panel adjacent its upper edge, and rearwardly and then upwardly to line with liner panel 41B the rear pocket panel 13B. Liner piece 41 at the upper edge of panel 13B then turns downwardly and forwardly to line with panel 41C the pocket-covering flap 29. The gussets 15 are lined by separate small pieces 43 of fleecy material. As a final refinement tucks 45 may be stitched in the ends of panel 13C to improve its conformation to the rounded ends of the seat backs or cushions.

FIGS. 4 and 5 illustrate typical installations of the utility bag. In FIG. 4, the supporting panel 13C protectively overlies and covers the upper surface of the seat cushion C thus dependingly supporting the pocket portion of the bag against the front surface of seat cushion C. Straps 17 extend downwardly around the rear edge of cushion C and their hooks 21 engage over spring-supporting wires or bars 22. The pocket-bottom-anchoring straps 23 extend under the lower edge of the cushion-supporting seat base 47 and their hooks 21 similarly anchor to wires or bars 22.

In FIG. 5, the utility bag 11 is mounted against the back B of an automobile seat. Straps 23 pass under the lower edge of back B and their terminal hooks 21 engage bars 22. The support panel 13C extends over the upper edge of seat back B and then protectively downwardly over its front surface with its edge being tucked between the adjacent edges of the back B and the seat cushion C. The straps 17 extend down and around the rear edge of cushion C and are fastened to bars 22 by hooks 21.

While I have disclosed a preferred embodiment of my invention, it is to be understood that many changes can be made in the size, shape, composition and arrangement of the parts without departing from the spirit of the invention as defined by the subjoined claims.

I claim:

1. In a utility bag for use upon the seat structure of an automobile, elongated flexible panel means having a width substantially equal to the width of the seat with which said bag is used, said panel means being of a length to substantially completely cover a surface of a seat and to extend into overlying relationship with another surface of a seat, said panel means at one end including an upwardly folded portion coextensive in width and integral with said panel means, gussets at the opposite edges of said folded portion connecting the edges of said folded portion to said panel means to provide an elongated upwardly open pocket having a length substantially equal to the width of said panel means, an upright rigid divider extending substantially from gusset to gusset in said pocket substantially equidistant from said folded portion and said panel means dividing said pocket into compartments, a covering flap secured to said panel means above said pocket and extending downwardly over said folded portion and covering the upwardly open pocket, a liner within said pocket secured along the upper edge of said folded portion and along the lower edge of said flap, said liner extending downwardly along said folded portion within said pocket and enclosing said divider to maintain said divider within said pocket, said liner extending from said divider along said panel means within said pocket and along said flap overlying said pocket, strap means spanning across the open upper part of the pocket beneath said covering flap and connected respectively to said panel means and adjacent the upper edge of said folded portion to prevent sagging of said folded portion away from said panel means, and adjustable means for detachably mounting said utility bag on an automobile seat.

2. In a utility bag for use upon the seat structure of an automobile, elongated flexible panel means having a width substantially equal to the width of the seat with which said bag is used, said panel means being of a length to substantially completely cover a surface of a seat and to extend into overlying relationship with another surface of a seat, said panel means at one end including an upwardly folded portion coextensive in width and integral with said panel means, gussets at the opposite edges of said folded portion connecting the edges of said folded portion to said panel means to provide an elongated upwardly open pocket having a length substantially equal to the width of said panel means, an upright divider extending substantially from gusset to gusset in said pocket substantially equidistant from said folded portion and said panel means dividing said pocket into compartments, a liner within and protectively lining said pocket and enclosing the divider, strap means spanning across the open upper part of the pocket and connected respectively to said panel means and adjacent the upper edge of said folded portion to prevent sagging of said folded portion away from said panel means, and means for detachably mounting said utility bag on an automobile seat.

3. In a utility bag for use upon the seat structure of an automobile, elongated flexible panel means having a width substantially equal to the width of the seat with which said bag is used, said panel means being of a length to substantially completely cover a surface of a seat and to extend into overlying relationship with another surface of a seat, said panel means at one end including an upwardly folded portion coextensive in width and integral with said panel means, gussets at the opposite edges of said folded portion connecting the edges of said folded portion to said panel means to provide an elongated upwardly open pocket having a length substantially equal to the width of said panel means, an upright rigid divider extending substantially from gusset to gusset in said pocket substantially equidistant from said folded portion and said panel means dividing said pocket into compartments, a covering flap secured to said panel means above said pocket and extending downwardly over said folded portion and covering the upwardly open pocket, a liner within said pocket secured along the upper edge of said folded portion and along the lower edge of said flap, said liner extending downwardly along said folded portion within said pocket and enclosing said divider to maintain said divider within said pocket, said liner extending from said divider along said panel means within said pocket and along said flap overlying said pocket, and means for detachably mounting said utility bag on an automobile seat.

4. In a utility bag for use upon the seat structure of an automobile, elongated flexible panel means having a width substantially equal to the width of the seat with which said bag is used, said panel means being of a length to substantially completely cover a surface of a seat and to extend into overlying relationship with another surface of a seat, said panel means at one end including an upwardly folded portion coextensive in width and integral with said panel means, gussets at the the opposite edges of said folded portion connecting the edges of said folded portion to said panel means to provide an elongated upwardly open pocket having a length substantially equal to the width of said panel means, an upright rigid divider extending substantially from gusset to gusset in said pocket substantially equidistant from said folded portion and said panel means dividing said pocket into compartments, a covering flap secured to said panel means above said pocket and extending downwardly over said folded portion and covering the upwardly open pocket, a liner within said pocket secured along the upper edge of said folded portion and along the lower edge of said flap, said liner extending downwardly along said folded portion within said pocket and enclosing said divider to maintain said divider within said pocket, said liner extending from said divider along said panel means within said pocket and along said flap overlying said pocket.

5. In a utility bag for use upon the seat structure of an automobile, elongated flexible panel means having a width substantially equal to the width of the seat with which said bag is used, said panel means being of a length to substantially completely cover a surface of a seat and to extend into overlying relationship with another surface of a seat, said panel means at one end including an upwardly folded portion coextensive in width and integral with said panel means, means connecting the edges of said folded portion to said panel means to provide an elongated upwardly open pocket having a length substantially equal to the width of said panel means, a covering flap secured to said panel means above said pocket and extending downwardly over said folded portion and covering the upwardly open pocket, a liner within said pocket secured along the upper edge of said folded portion and along the lower edge of said flap, said liner extending downwardly along said folded portion within said pocket and along said panel means within said pocket and along said flap overlying said pocket, strap means spanning across the open upper part of the pocket beneath said flap and connected respectively to said panel means and adjacent the upper edge of said folded portion to prevent sagging of said folded portion away from said panel means, and adjustable means for detachably mounting said utility bag on an automobile seat.

6. In a utility bag for use upon the seat structure of an automobile, elongated flexible panel means having a width substantially equal to the width of the seat with which said bag is used, said panel means being of a length to substantially completely cover a surface of a seat and to extend into overlying relationship with another surface of a seat, said panel means at one end including an upwardly folded portion coextensive in width and integral with said panel means, means connecting the edges of said folded portion to said panel means to provide an elongated upwardly open pocket having a length substantially equal to the width of said panel means, a covering flap secured to said panel means above said pocket and extending downwardly over said folded portion and covering the upwardly open pocket, a liner within said pocket secured along the upper edge of said folded portion and along the lower edge of said flap, said liner extending downwardly along said folded portion within said pocket along said panel means within said pocket and along said flap overlying said pocket, and adjustable means for detachably mounting said utility bag on an automobile seat.

7. A utility bag for use in a vehicle having a seat including a generally vertical back rest portion and a generally horizontal seat portion, said seat portion including horizontal support rods exposed to the bottom surface thereof, said bag comprising an elongated flexible panel having a width substantially equal to the width of the seat and a length to cover the occupant engaging area of one portion of the seat, one end edge portion of the panel extending beyond the covered portion of the seat and being reversely folded to form a partial panel overlying a portion of the elongated panel, gussets interconnecting the side edges of the partial panel and the side edge of said portion of the elongated panel thereby defining a pocket extending throughout the width of the seat, a plurality of anchor straps attached to the edge of the elongated panel remote from the pocket, means on the free end of each strap for detachable engagement with the horizontal support rods of the seat, a plurality of anchor straps attached to said elongated panel adjacent the reverse fold, means on the free end of each of said last mentioned anchor straps for detachable engagement with the horizontal support rods of the seat, a covering flap attached to said elongated panel in longitudinally spaced relation to the edge of the partial panel and forming a closure for the pocket, said flap extending throughout the width of the elongated panel, said partial panel being disposed in substantially an upright position whereby the flap will normally be retained in closing relation to the pocket by the force of gravity, and means interconnecting the free edge of the partial panel and said elongated panel for retaining the free edge of the partial panel substantially parallel to the elongated panel.

8. The combination of claim 7 wherein said means interconnecting the free edge of the partial panel and the elongated panel includes a plurality of spaced straps, an intermediate of said straps having one end detachably connected to the free edge of said partial panel thereby facilitating the ingress and egress of elongated articles in relation to the pocket, said spaced straps underlying said flap and forming a support therefor.

9. The combination of claim 7 together with a lining mounted on the inner surface of the gussets, a lining mounted on the inner surface of the cover flap, a rigid partition member disposed in said pocket and extending substantially completely between the gussets and throughout the height of the pocket, a lining member covering the inner surface of said partial panel and said portion of the elongated panel, the central portion of said lining member enclosing and being secured to the partition, said lining member being of soft material for protecting articles disposed in the pocket, said partition dividing the pocket into two elongated components.

References Cited in the file of this patent
UNITED STATES PATENTS

| | | |
|---|---|---|
| 1,646,730 | Goerk | Oct. 25, 1927 |
| 1,983,266 | Berkowitz | Dec. 4, 1934 |
| 2,223,532 | Sallop | Dec. 3, 1940 |
| 2,507,842 | Waddill | May 16, 1950 |
| 2,627,952 | Korchmar | Feb. 10, 1953 |
| 2,822,968 | Jackson | Feb. 11, 1958 |

FOREIGN PATENTS

| | | |
|---|---|---|
| 280,696 | Switzerland | May 1, 1952 |